Aug. 1, 1950    A. J. DE MOUDE ET AL    2,517,290
SELF-SEALING PIPE CONNECTION
Filed Nov. 12, 1947
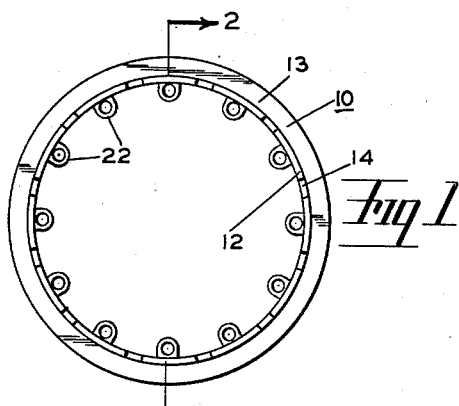
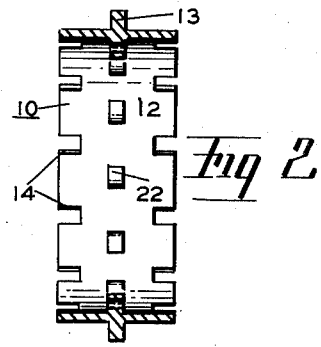
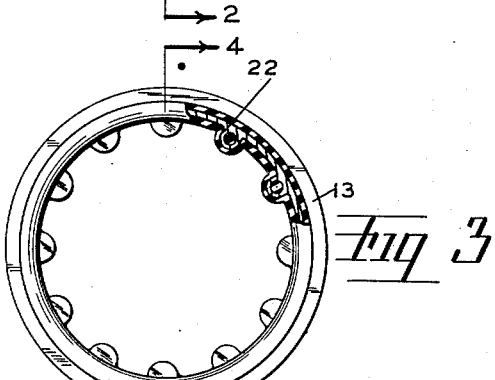
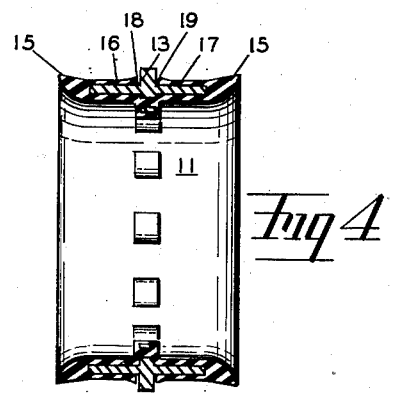
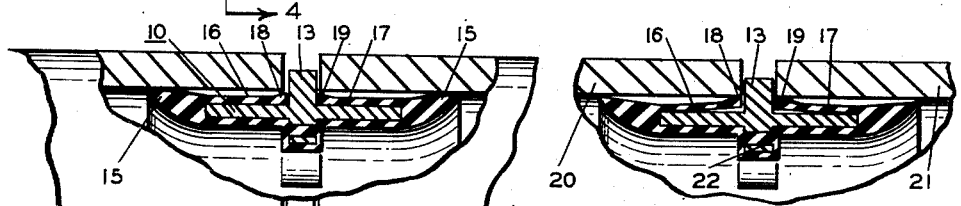
INVENTORS
ADRIAN J. DE MOUDE
WILLIAM T. STOUT
BY
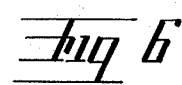
ATTORNEY

Patented Aug. 1, 1950

2,517,290

UNITED STATES PATENT OFFICE 2,517,290

SELF-SEALING PIPE CONNECTION

Adrian J. De Moude and William H. Stout, Portland, Oreg.

Application November 12, 1947, Serial No. 785,206

4 Claims. (Cl. 285—197)

This invention relates in general to means for providing a sealing end-to-end connection between pipes, for example, between pipe sections in an irrigation pipe line and the like.

More specifically this invention relates to flexible gasket connections which can be used to provide a self-sealing juncture between adjacent ends of a pair of pipe sections of identical size and shape, a contrast to the various sealing gasket connections employed when the connected pipe ends are of different diameters and thus of the "spigot and bell" type.

An object of the present invention is to provide an improved resilient and flexible gasket, of the self-sealing type, which will have suitable re-inforcement so as to enable the gasket to withstand heavy pressures and hard usage.

Another object of this invention is to provide a self-sealing gasket which will be capable of maintaining the sealing connection not only under high pressure within the pipe line, but even under conditions in which a partial vacuum may be set up within the pipe.

A further object of this invention is to provide a self-sealing gasket, adapted for connecting two identical pipe ends, which will be incapable of slipping out of place, regardless of any pressure conditions, as long as the pipe ends are not separated longitudinally.

A still further object is to provide an improved gasket connection adapted specifically for pipe ends of the same internal diameter, which will be simple and practical to use and relatively simple and inexpensive to manufacture.

In the following brief description of our invention, from which description the manner in which the above mentioned objects and other incidental advantages are obtained will be apparent, reference is made to the accompanying drawings, in which:

Fig. 1 is an end elevation of a metal reinforcement member constituting a part of our invention;

Fig. 2 is a transverse sectional elevation of the same taken on line 2—2 of Fig. 1;

Fig. 3 is an end elevation of our complete sealing connection with a portion of the same shown in section for the sake of clarity;

Fig. 4 is a transverse sectional elevation taken on line 4—4 of Fig. 3;

Fig. 5 is a side elevation, partly in section, of two pipe ends connected in accordance with our invention, this figure being drawn to a larger scale and illustrating the manner in which our invention functions under pressure conditions within the pipe line; and Fig. 6 is a fragmentary sectional elevation, similar in part to Fig. 5, and drawn to the same scale, illustrating the manner in which our invention functions when the pressure within the pipe line becomes less than the pressure outside.

Our self-sealing pipe connection comprises two integral members, a rigid metal reinforcement member which is indicated in general by the reference character 10, and an encompassing resilient gasket member indicated in general by the reference character 11.

The form of the metal inner reinforcement member 10 will first be described with reference to Figs. 1 and 2. This member 10 consists of a ring or cylindrical body 12 having an outer annular, centrally located rib or flange 13. The ends of a cylindrical body 12, preferably have regularly-spaced notches or cut-out portions 14. A plurality of equally-spaced integral loops 22 extend inwardly from the inside face of the body 12 substantially in the same plane as the outside annular rib 13.

The resilient gasket component or member 11 is formed around the reinforcement member 10 and entirely covers the reinforcement member with the exception of the annular flange 13, which for a special reason, is left entirely uncovered. The gasket member 11 is preferably made of rubber, or of an impervious composition material having qualities similar to rubber, particularly as regards resiliency or elasticity. The shape of this gasket member is shown clearly in Figs. 4, 5, and 6. At each rim or marginal edge the rubber gasket is tapered to a pointed lip 15, which is positioned some distance beyond the corresponding end of the reinforcement member, and the outer diameter of these lip portions 15 is increased slightly and is of such size as to cause the lips 15 normally to fit snugly against the inside cylindrical surfaces of the pipe ends when the connection is set in place.

The gasket member 11 is formed in a mold about the inner reinforcement member 10 and during this molding process the rubber, or other material from which the gasket is formed, is caused to cover the loops 22 of the reinforcement member completely and also to pass through and fill the loop openings, with the result that the central portion of the inside layer or face of the gasket member will be securely anchored to the reinforcement member. The notches or cut-out portions 14 (Fig. 2), of the reinforcement member will also be filled with the gasket material in the gasket molding operation and thus internal rib connections will extend through these notches between the inner and outer layers of the gasket.

The outer face of the gasket member is left with an annular opening to permit the outside flange or rib 13 of the reinforcement member to remain uncovered and to extend beyond the outer face of the gasket. In other words, when the gasket member 11 is molded about the reinforcement member 10, the central part of the outer surface of the gasket member is formed into a pair of cylindrical flaps 16 and 17 extending from the longitudinal ends of the reinforcement member to the sides of the rib or flange 13, as shown in Figs. 4, 5, and 6. The inner or free edges 18 and 19 of these flaps 16 and 17 respectively are preferably of slightly increased thickness.

The manner in which our self-sealing pipe connection functions will now be explained with reference to Figs. 5 and 6, and the two conditions which may be encountered in a pipe line, namely, internal pressure within the pipe line and partial vacuum within the pipe line, will be considered.

In Fig. 5 our sealing connection is shown in place in the adjacent ends of the two pipe sections 20 and 21. The pipe sections 20 and 21 have the same internal diameter and are assumed to extend substantially in axial alignment with each other and to constitute a portion of a pipe line, for example, portion of a demountable irrigation pipe line extending over the surface of the ground. In Fig. 5 it is further assumed that, at the moment, water under considerable head pressure is passing through the pipe. With the sealing connection in position, as shown in Fig. 5, the pressure within the pipe line, regardless of the direction of flow of the water, will cause the lips 15 of the rubber gasket member to be pressed firmly against the inner walls of the respective pipes. As is well known with internal gaskets of this general type, the greater the pressure within the pipe line the more firmly and tightly will the lips 15 be pressed against the surrounding pipe walls. Thus, as long as the sealing connection remains in position under such conditions a pressure seal is maintained. However, if the rubber gasket member were not reinforced in some manner there might be danger of a blow-out occurring in the narrow slot between the adjacent pipe ends, should the internal pressure become sufficiently great. But our reinforcing member 10 prevents any possibility of such gasket blow-out.

With a strong current of water in the pipe line there is also danger that an ordinary internal gasket would be pushed along inside the pipe connection until the connection between the pipes is uncovered. However, this is prevented in our device by the annular rib or flange 13 provided on the reinforcement member.

Furthermore, if the ground on which the pipe sections are laid is uneven, there would be some danger of the adjacent pipe ends being pushed out of alignment with respect to each other with resulting failure of the connection between the pipes as a result. However, the cylindrical body of our reinforcement member 10 extending into each of the pipe ends, holds these pipe ends in substantial registration as long as the pipe sections are not moved longitudinally.

Referring now to Fig. 6, let it be assumed that, due to the sudden shutting off of the water at the intake end of the pipe line, or to other reasons, a partial vacuum is momentarily set up within the pipe line. Let it be further assumed that under these conditions it is desired to prevent the entry of outside water or air into the pipe line. When air or water attempts to enter past the rib 13, as a result of the partial vacuum within the pipe line, the ends 18 and 19 of the flaps 16 and 17 will be drawn outwardly and caused to press more firmly against the inside surfaces of the pipes at the ends of the pipe sections. The entering air or water will pass down between the underneath surface of these flaps and the outside face of the reinforcement member. The greater the relative outside pressure the stronger will be the thrust between the underneath surface of these flaps and the reinforcement member and the stronger will be the seal between the flaps and the inside surfaces of the pipes. The air or water thrusting its way between the underneath surface of the flaps 16 and 17 and the inner reinforcement member will attempt to continue on its way and, if the pressure of the same increases sufficiently, some of this air or water will force its way around the ends of the reinforcement member and between the innermost face of the reinforcement member, and the inner layer of the gasket member. In our experience with various types of gasket reinforcements under such conditions we found that unless the inner layer of our gasket member is held against the innermost face of the reinforcement member by some means, the force of the entering air or water, when it becomes sufficiently great, will push the inner layer of the gasket inwardly away from the reinforcement member until an inside blow-out of the gasket member occurs. We found a solution to this problem, however, in the anchoring of the inner layer of the gasket to the loops 22 of the reinforcement member and this anchoring prevents any such internal blow-out of the gasket from taking place.

The webs of the gasket member, extending through the notches 14 of the reinforcement member and joining the inner and outer layers of the gasket member, also hold the gasket firmly against the innermost face of the reinforcement member and further lessen any possibility of the gasket member being drawn inwardly away from the reinforcement member.

Thus our self-sealing pipe connection functions to maintain the desired seal between the pipe ends regardless of changes in pressure conditions and regardless of whether protection is required against inside or against outside pressure. Minor modifications could be made in either the reinforcement member or the gasket member which we have shown without departing from the principle of our invention. However, we consider the most satisfactory form in which our invention can be made to be substantially that which we have illustrated and described.

We claim:

1. In a self-sealing pipe connection adapted for use with a pair of pipe sections having adjacent ends of approximately the same internal diameter, a reinforcement member and an encompassing gasket component member, said reinforcement member having a rib extending from its outer surface, gasket anchoring means on said reinforcement member, said gasket member covering the inner and outer surfaces of said reinforcement member with the exception of said rib, the longitudinal ends of said gasket member extending beyond the longitudinal ends of said reinforcement member respectively and formed into tapering sealing lips, the portion of said gasket member extending over the outer surface of said reinforcement member being formed into a pair of oppositely-positioned annular flaps terminating one on each side of said outer rib respectively and capable of slight outward movement with respect to said reinforcement member, the inside portion of said gasket member secured to said gasket anchoring means, whereby when said connection is inserted in place in adjacent pipe ends with said rib said flaps will act to seal the connection against outside pressure, and said end lips of said gasket member will act to seal the connection from inside pressure within the pipes.

2. In a self-sealing pipe connection of the character described, a tubular reinforcement member and an encompassing gasket component member, said reinforcement member having a rib extending from its outer surface and extending in a plane substantially perpendicular to the axis of said member, said gasket member substantially covering the inner and outer surfaces of said reinforcement member, the portion of said gasket member extending over the outer surface of said reinforcement member being formed into a pair of oppositely-positioned annular flaps, one on each side of said outer rib respectively and capable of slight outward movement with respect to said reinforcement member, the thickness of said flaps being slightly increased at their free ends, the ends of said reinforcement member having cut-out sections and said gasket member extending through said cut-out sections so as to provide internal webs between said flaps and the inside portion of said gasket member, whereby when said connection is inserted in place in adjacent pipe ends with said rib said flaps will act to seal the connection against outside pressure, and the ends of said gasket member will act to seal the connection from inside pressure within the pipes.

3. In a self-sealing pipe connection of the character described adapted for use with a pair of pipe sections having adjacent ends of approximately the same internal diameter, a cylindrical reinforcement member and a gasket component member, said reinforcment member having an annular flange extending from its outer surface, a plurality of gasket anchoring loops extending inwardly from the inner surface of said reinforcement member, said gasket member covering the inner and outer surfaces of said reinforcement member with the exception of said flange, the longitudinal ends of said gasket member extending beyond the longitudinal ends of said reinforcement member respectively and formed into thin sealing lips, the portion of said gasket member extending over the outer surface of said reinforcement member being formed into a pair of oppositely-positioned annular flaps terminating one on each side of said flange respectively and capable of slight outward movement with respect to said reinforcement member, the inside portion of said gasket member secured to said gasket anchoring means, whereby when said connection is inserted in place in adjacent pipe ends with said flange said flaps will act to seal the connection against outside pressure, and said end lips of said gasket member will act to seal the connection from inside pressure within the pipes.

4. A self-sealing pipe connection of the character described including a cylindrical reinforcement member and a gasket component member, said reinforcement member having an annular flange extending from its outer surface located approximately at the middle longitudinally of said reinforcement member, gasket anchoring means on said reinforcement member, said gasket member covering the inner and outer surfaces of said reinforcement member with the exception of said flange, the longitudinal ends of said gasket member extending beyond the longitudinal ends of said reinforcement member respectively and formed into thin tapering sealing lips, the portion of said gasket member extending over the outer surface of said reinforcement member being formed into a pair of oppositely-positioned annular flaps terminating one on each side of said flange respectively and capable of slight outward movement with respect to said reinforcement member, the inside portion of said gasket member secured to said gasket anchoring means, whereby when said connection is inserted in place in adjacent pipe ends with said flange said flaps will act to seal the connection against outside pressure, and said end lips of said gasket member will act to seal the connection from inside pressure within the pipes.

ADRIAN J. DE MOUDE.
WILLIAM H. STOUT.

REFERENCES CITED

The following references are of record in the file of this patent:

UNITED STATES PATENTS

| Number | Name | Date |
|---|---|---|
| 2,068,334 | Kusebauch | Jan. 19, 1937 |
| 2,210,833 | Clough | Aug. 6, 1940 |
| 2,261,566 | Russell et al. | Nov. 4, 1941 |
| 2,403,364 | Hertzell et al. | July 2, 1946 |